United States Patent [19]

Reames

[11] Patent Number: 4,680,755
[45] Date of Patent: Jul. 14, 1987

[54] REAL-TIME END OF PACKET SIGNAL GENERATOR

[75] Inventor: Stephen P. Reames, Colorado Springs, Colo.

[73] Assignee: Hewlett Packard Company, Palo Alto, Calif.

[21] Appl. No.: 798,054

[22] Filed: Nov. 14, 1985

[51] Int. Cl.⁴ ............................ H04J 3/02; H04J 3/24; H04J 3/12

[52] U.S. Cl. ........................................ 370/85; 370/94; 370/110.1

[58] Field of Search ........................ 370/85, 97, 58, 86, 370/102, 88, 89, 94, 60, 110.1; 340/825.5

[56] References Cited

U.S. PATENT DOCUMENTS 4,491,944 1/1985 Caizergues et al. ............. 370/110.1
4,577,317 3/1986 Chu et al. ......................... 370/110.1
4,592,048 5/1986 Beckner et al. ....................... 370/60

Primary Examiner—Douglas W. Olms
Assistant Examiner—Frank M. Scutch, III
Attorney, Agent, or Firm—Christopher J. Byrne; Jon R. Stark

[57] ABSTRACT

Provided is a circuit for signalling the real-time end of a local area network packet as the packet is being pulled off a transmission medium and stored in memory. Storage of the packet is performed by a local area network coprocessor. The circuit monitors for the simultaneous occurrence of three conditions: the coprocessor is in a write-to-memory cycle; it is writing to the address of a status word pertaining to a packet; and the most significant bit of the status word is being set. If all three conditions are true, the circuit asserts the real-time end-of-packet signal.

2 Claims, 4 Drawing Figures

| PREAMBLE | DESTINATION | SOURCE | TYPE | DATA | FRAME CHECK |

FIG 1

REAL-TIME END OF PACKET SIGNAL GENERATOR

BACKGROUND

A Local Area Network (LAN) is a communication network that provides interconnection of a variety of data communicating devices within a small area. *Local Networks*, p.2, by William Stallings, (MacMillan Publishing Company, 1984). A typical LAN is a computer network limited to a geographically small area such as a plant site or an office building. Various devices, such as computers, terminals, etc., are "plugged into" the network at various locations on the network. Each such device is assigned an address so that digital communications between devices in the network may be properly delivered and received.

A well known and commercially accepted LAN standard is encompassed by the Institute of Electrical and Electronic Engineers (IEEE) standard 802.3. This standard is well known in industry under the name "Ethernet." The IEEE 802.3 standard features a Carrier Sense Multiple Access with Collision Detection (CSMA/CD) media access method whereby two or more stations (devices) share a common bus transmission medium, typically a coaxial cable. To transmit over the LAN, a station or device waits for a quiet period on the bus, that is, no other station is transmitting, and then sends its intended message in bit serial form, at rates up to 10 Mbits/sec.

In the Ethernet/IEEE 802.3 system, messages between devices on the network travel in packets, also known as frames, on the bus. An Ethernet packet is displayed in FIG. 1. In examining the packet from head to tail, we see that it consists of a 64-bit preamble, a 48-bit destination address, a 48-bit source address, a 16-bit type field, and a data field that may be from 46 bytes up to 1500 bytes long, wherein the last 4 bytes constitute a 32-bit cyclic redundancy check (CRC) or frame check sequence. This Ethernet message format establishes the standard required for widespread implementation of LAN technology.

All devices on LANs, such as computers, terminals, test equipment, etc., must naturally possess LAN interface circuitry. A commonly used and important component of such circuitry is the Intel 82586 LAN co-processor. The 82586 performs numerous functions including, among many other things, framing, preamble generation and stripping, source address generation, destination address checking and CRC generation/checking. *Microsystem Component Handbook*, Volume II, p. 7–288 (Intel, 1984)

An important segment of LAN technology in which the 82586 plays a critical role involves data communications test equipment, commonly known as protocol analyzers. These devices are designed to monitor, as well as generate, traffic on the LAN, such as an Ethernet transmission bus, and then analyze it for the purposes of field service; electronic data processing center support; network component research, development, manufacture, installation and service; and general network trouble shooting.

Such an analyzer may be required to "eavesdrop" on the LAN, examining packet traffic for packets of particular configurations. Used in such a manner, the analyzer reads packets off the LAN, without disrupting their transmission, and sends what it reads through a comparison process. The process involves simultaneously placing the packets in memory and circulating them past so-called trap machines which compare them with target configurations. The comparison process is known as filtering. Limited amounts of memory and other resources require that packets which fail to match the target configurations be discarded while the matching packets are retained in memory.

Obviously, to make valid comparisons, a trap machine must be able to determine the end of a packet so that it can distinguish one packet from another. Current solutions to this problem use the interrupt output pin of the 82586. In the rapid comparison cycles of some trap machines, however, the interrupt signal is inadequate in the case where two packets arrive one immediately after the other, that is, "back-to-back," because the interrupt signal arrives too late. In such a case, data from the second packet is already being stored before the interrupt from the first packet occurs. The solution requires generation of another real-time signal which triggers before the data in the second packet is stored. The circuit to generate this real-time end-of-packet (EOP) signal is the present invention.

SUMMARY OF THE INVENTION

The preferred embodiment of present invention is intended for use with the Intel 82586 Local Area Network (LAN) coprocessor. The 82586 pulls Ethernet packets (frames) off a transmission medium and stores them, in a highly structured format, in host device memory. Each packet occupies a single uniformly structured area of memory. Although packet size, and hence the size of the amount of memory it occupies may vary, the structure of the memory area set out by the 82586 is essentially the same for each packet. The 82586 keeps track of separate packets in memory by setting the most significant bit of a status word it associates with each packet's memory structure when each packet is completely received. The most significant bit of each status word is known as the "complete" bit. The present invention provides for a real-time end-of-packet signal by monitoring for three concurrent conditions: the 82586 is in a write cycle; it is writing to the address of a status word; and the complete bit is set. If all three of these are true, then the present invention asserts the end-of-packet signal.

BRIEF DESCRIPTION OF THE DRAWINGS

FIG. 1 is a schematic diagram of an Ethernet packet.

DESCRIPTION OF THE PREFERRED EMBODIMENT

To understand the preferred embodiment of the present invention, one must first be familiar with operation of the Intel 82586 LAN co-processor. The 82586 does much of the work in detecting the preamble, destination address, source address, type field and data field of an incoming Ethernet packet. It also initially stores away this information for each packet received. The 82586 performs these functions, among others, and communicates with its host device via shared memory. The 82586 has direct access to the memory of the host device and may autonomously transfer data blocks, thereby relieving the host CPU of byte transfer overhead. *Microsystem Components Handbook*, Volume II, p. 7,287–321 (Intel, 1984).

Conceptually, the 82586 consists of two units, a command unit (CU) and a receive unit (RU). The CU executes commands stored in shared memory. The RU performs all functions related to packet reception. The CU and RU may perform their functions in parallel and host CPU intervention is necessary only after the CU executes a string of commands or the RU stores a sequence of packets.

The shared memory structure critical to 82586 operation consists of four parts: an initialization address; a system control block (SCB), containing, among other things, pointers to other parts of the shared memory; a command list (CL); and a receive frame area (RFA) for holding an Ethernet packet. Most important, for the purposes of the present invention, is the RFA, which is essentially a memory structure, within the shared memory structure, pointed to by a receive frame pointer in the SCB.

To receive frames, that is, Ethernet packets, the host CPU sets aside a proper amount of receive buffer space in memory and then enables the RU of the 82586. The RU then waits for frames (packets) and automatically stores them in the RFA.

The RFA, consists of a receive descriptor list and a free buffer list. The receive descriptor list consists of individual receive frame descriptors (RFD), wherein each RFD pertains to a single received frame. The free buffer list consists of individual buffer descriptors (BD) which point to data buffers. Each RFD, is a chunk of memory used by the 82586 to store the destination and source address, type field and status of each frame received. Each RFD also contains pointers to the next RFD and to the free buffer list.

When a frame, as displayed in FIG. 1, arrives, the 82586 stores the destination and source address and type field in the available RFD. The data field of the frame is then stuffed into data buffers, beginning with the next free data buffer on free buffer list, which is pointed to by the current RFD. As one data buffer is filled, another is automatically fetched until the entire data field of that frame is stored. Following receipt of an entire frame, various housekeeping tasks, such as fetching the address of the next free RFD, are performed.

Figure 4:
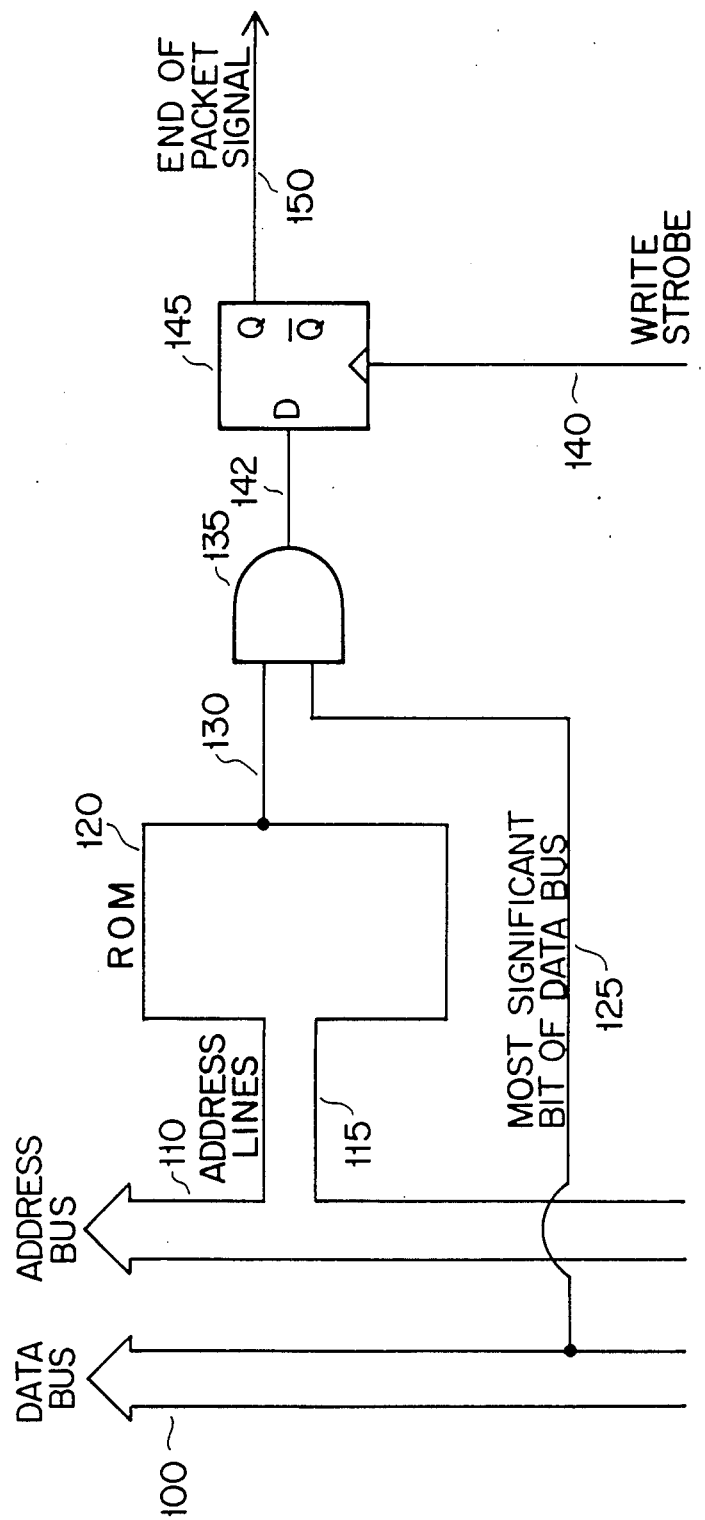
FIG. 4 is a schematic block diagram of the preferred embodiment of the present invention.

In the preferred embodiment, each RFD in shared memory is configured as shown in FIG. 4. The status word at the head of the RFD includes a "complete bit," which is the most significant bit of the status word. The bits of the status word are set by the 82586. The complete bit is set when the frame peculiar to that RFD has been stored.

As noted in the Background, a real-time end-of-packet (EOP) signal, speedier than the generic interrupt asserted by the 82586, is required for fast and reliable filtering. The present invention provides for such an EOP signal by monitoring for the simultaneous occurrence of three conditions: the 82586 is in a write-to-memory cycle; the write is addressed to the status word of the RFD; and the complete-bit of that status word is being set. If all three conditions are true, then a real-time EOP signal may be truthfully asserted. The preferred embodiment of the present invention uses a look-up read only memory (ROM) to determine if any given write is addressed to a status word. If a write is occurring, and it is addressed to one of the status words, and the complete-bit is a "1," then the EOP signal is asserted and delivered to other devices for use.

Figure 2:
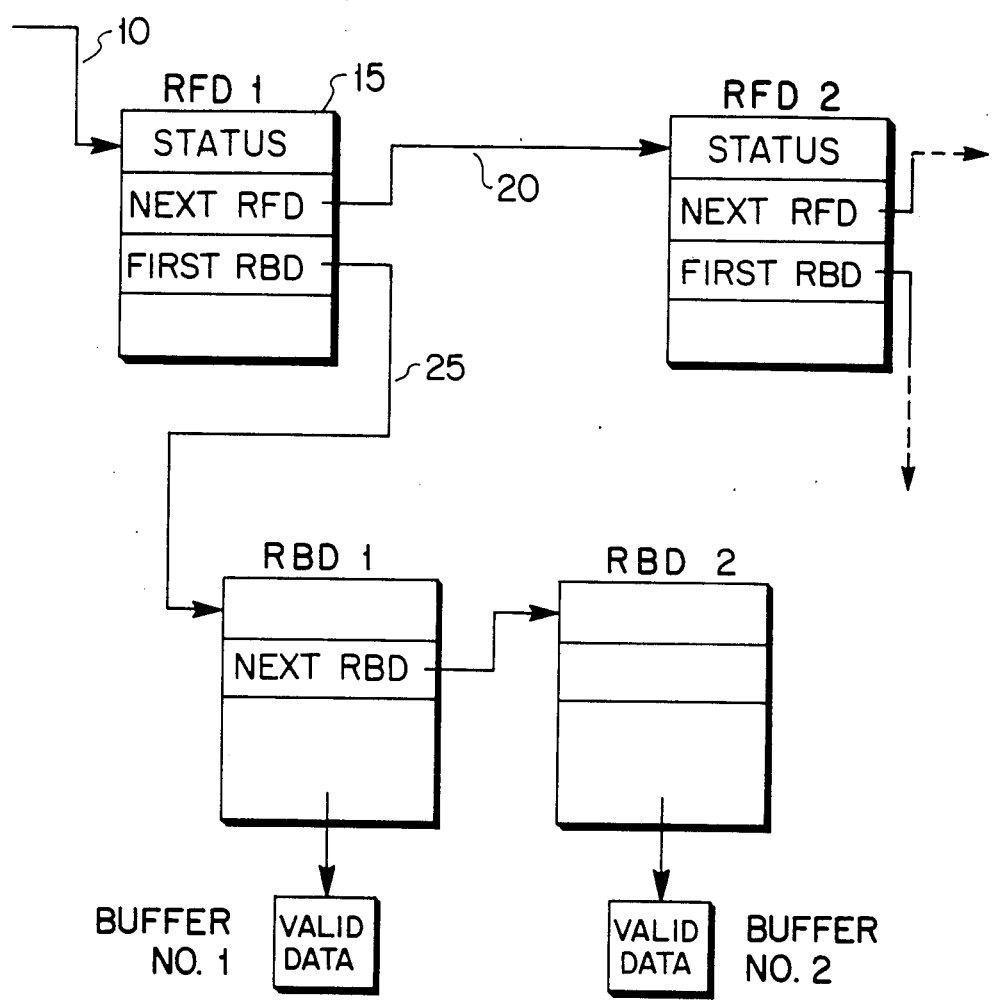
FIG. 2 is a schematic block diagram of the shared memory where Ethernet Frames are stored.

FIG. 2 is a schematic block diagram of the shared memory structure where Ethernet Frames are stored by the 82586, known as the Receive Frame Area (RFA). As noted, the RFA consists of a list of Receive Frame Descriptors (RFD), wherein a single RFD is associated with a single received Ethernet frame. In addition, each RFD, among other things, points to a list of Receive Buffer Descriptors (RBD), wherein each RBD, among other things, points to a buffer used for holding the data field of an Ethernet frame. Also, whereas there is only one RFD per Ethernet frame, there may more than one RBD per RFD. That is, if the Ethernet frame holds too much data for a single RBD data buffer, then additional RBDs and data buffers will be linked until the frame is accommodated.

In FIG. 2, reference numeral 10 designates an RFA pointer which is resident at a pre-determined address in memory and which points to the first RFD in the RFA. Reference numeral 15 designates a status word, which is the first word of any RFD and indicates the status of that particular RFD. Reference numeral 20 designates a pointer to the next RFD in the RFA. The next-RFD-pointer is one of the words following the status word in a RFD. Reference numeral 25 designates a pointer to the first RBD associated with the RFD in question. The first-RFD-pointer is the word which follows the next-RFD-pointer in a RFD.

Figure 3:
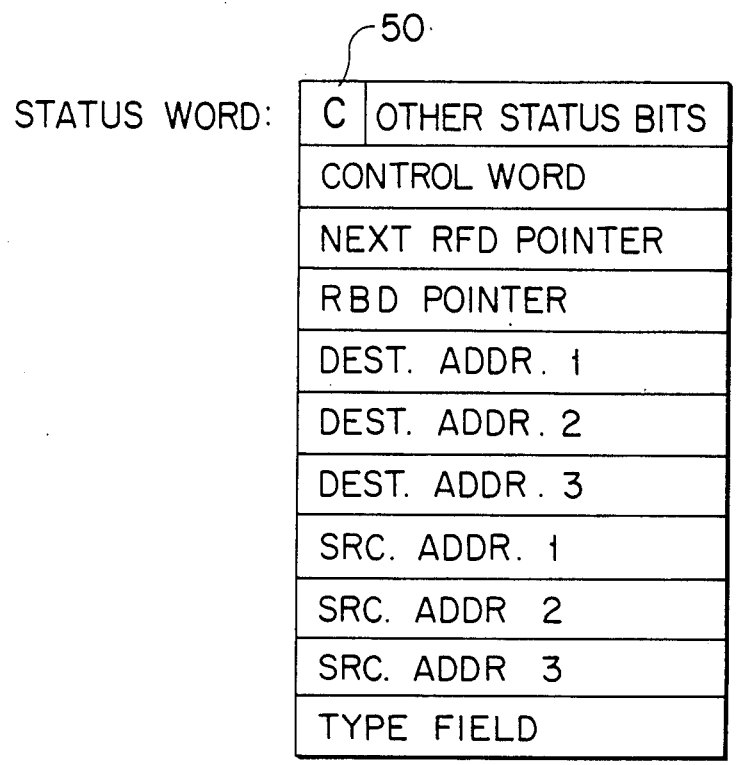
FIG. 3 is a block diagram of the format and structure of a typical Receive Frame Descriptor.

FIG. 3 is a block diagram displaying the format and structure of a typical RFD in detail. As can be seen from the diagram, each RFD, as used in the preferred embodiment of the present invention, consists of a block of eleven contiguous 16-bit words. The first word, as noted above, is the status word pertaining to that RFD. The second word is a control word. The third word points to the next RFD. The fourth word points to the first RBD associated with that RFD. The fifth, sixth and seventh words are used to hold the destination-address-field of the Ethernet frame to which that RFD pertains. The eighth, ninth and tenth word are used to hold the source-address-field of the frame. The eleventh word holds the type-field of the frame. (The data-field of the frame is placed in data buffers arranged by the RBDs associated with that RFD.)

Reference numeral 50 designates the most significant bit of the status word of any RFD, known as the complete bit and also known as the C bit. The complete bit of a status word is set by the 82586 when the end of the Ethernet frame, associated with the particular RFD to which that status word belongs, is completely stored in that RFD's RBD buffers. The setting of the complete bit is the key to the real-time end-of-packet signal provided by the present invention.

As noted, the Receive Frame Area (RFA) of shared memory is where the Ethernet frames are stored by the 82586, in the highly structured format shown in FIG. 2. In the preferred embodiment of the present invention, the RFDs of the RFA are restricted to a certain range of contiguous addresses within the RFA, wherein the range boundaries are known. In addition, given the format of RFDs, as shown in FIG. 3, every eleventh word in the RFD range will be a status word. The addresses of the status words are listed in a read only memory (ROM) chip.

When the 82586 has completed storing a frame, it sets the complete bit in the appropriate RFD status word, as noted above. In order to do so, the 82586 must have to write to the address of the status word in question. Hence, three conditions must be met to ensure that the end of the packet has been reached: the 82586is in a write cycle; it is writing to the address of a status word; and the complete bit is being set. The present invention monitors these three events and goes "high" when all three occur simultaneously, producing a real time end-of-packet signal.

To detect access by the 82586 to a status word, a look-up read-only-memory (ROM) is used, as noted, to determine if any write is addressed to the status word of an RFD. Again, the RFDs are limited to a certain section of memory, in which every eleventh word is status word. The ROM may then eavesdrop on the host device memory address bus the 82586 uses to write to memory. The ROM is designed to produce true output when the status words are addressed.

In addition, the 82586 provides a write strobe pin which indicates that the 82586 is performing a write memory cycle. *Microsystem Components Handbook,* volume II, p. 7-290 (Intel, 1984). This strobe signal may be monitored to detect for a write cycle.

Finally, the setting of the complete bit may be determined by monitoring the highest order data line, that is, the most significant bit, of the host device memory data bus during write cycles.

FIG. 4 is a schematic block diagram of the preferred embodiment of the present invention, showing the principle thereof. Reference numeral 100 of FIG. 4 designates the memory data bus over which the 82586 transmits data to the RFA. Reference numeral 110 of FIG. 4 designates the memory address bus over which the 82586 selects the addresses in the RFA to which it sends data over data bus 100. Reference numeral 115 designates a means by which a ROM, designated by reference numeral 120, "eavesdrops" on the memory address bus. ROM 120 is loaded with "true" values at addresses corresponding to the addresses of status words in the RFDs of the RFA. When status words are addressed in memory address bus 110, the appropriate address-select lines of ROM 120 are also addressed via means 115, thereby inducing a true output on the ROM output line, designated by reference numeral 130. All other address signals on memory address bus 110 will trigger a false output over ROM output line 130.

In addition, ROM output line 130 is combined with the most significant bit line of memory data bus 100 (via means 125) into an electronic AND gate, designated by reference numeral 135. The most significant bit of the memory data bus, bit #15 in the preferred embodiment, will carry data for the complete bit of the status words. Only when the output of ROM 120 and the complete bit are both true will the output of gate 135 be true. Hence, two of the three qualifying conditions for assertion of the end-of-packet signal, that is, a status word is addressed and the complete bit is being set, must be true in order for gate 135 to output a true value.

The output of gate 135 is delivered via means 142 to the input of a D-type flip-flop, designated by reference numeral 145. A D-type flip-flop is designed to produce, as output, the signal which is delivered to its input, when clocked. In the preferred embodiment, D-type flip-flop 145 is clocked via means 140 with write-strobe signal of the 82586. Hence, when the 82586 is in a write cycle, D-type flip-flop 145 is clocked and will therefore produce, via output means 150, the input signal delivered to it via means 142. Hence, means 150 delivers an accurate real-time end-of-packet signal. It will be true only when all three conditions are met: the 82586 is in a write cycle, a status word is being addressed and the complete bit is being set.

I claim:

1. An apparatus for generating an end-of-packet signal, said end-of-packet signal indicating, in real time, the occurrence, of the tail end of a local area network packet, said packet being transmitted on a local area network, said apparatus comprising:

a local area network coprocessor, said coprocessor being resident in a host device, said host device having memory and a memory address bus, said coprocessor being adapted to receive local area network packets in bit serial form from a local area network transmission medium, to store said packets in host device memory in a uniform structured format, to create and maintain an associated status word for each stored packet, the most significant bit of each said status word being set to true when the end of said packet is received, and to generate a write-strobe-signal whenever said coprocessor is in a write-to-memory cycle;

a memory-address-comparison means for comparing the address in host device memory to which said coprocessor is writing with addresses of said status words, and for generating an output signal when the address in host device memory being written to by said coprocessor is the address of one of said status words;

an electronic logic gate having as inputs said output signal of said memory-address-comparison means and the most significant data-bit of data words written to said memory of said host device, said electronic logic gate producing a true output when both of said inputs are true; and a clocked flip-flop circuit, having as input the output of said electronic logic gate, and having as clock signal the write-strobe-signal of said coprocessor, said clocked flip-flop circuit producing as output said end-of-packet signal.

2. An apparatus as in claim 1 wherein the memory-address-comparison means comprises a look-up read only memory, said read only memory having address select lines which read on the memory address bus of said host device such that whatever address signals are placed on said address bus will drive said address select lines, said read only memory being configured to produce a true output when the address of one of said status words is placed on said address bus.

* * * * *